Feb. 3, 1959 — B. K. STUBER — 2,871,731
AUTOMATIC RECESSING DEVICE
Filed Dec. 3, 1956 — 4 Sheets-Sheet 1
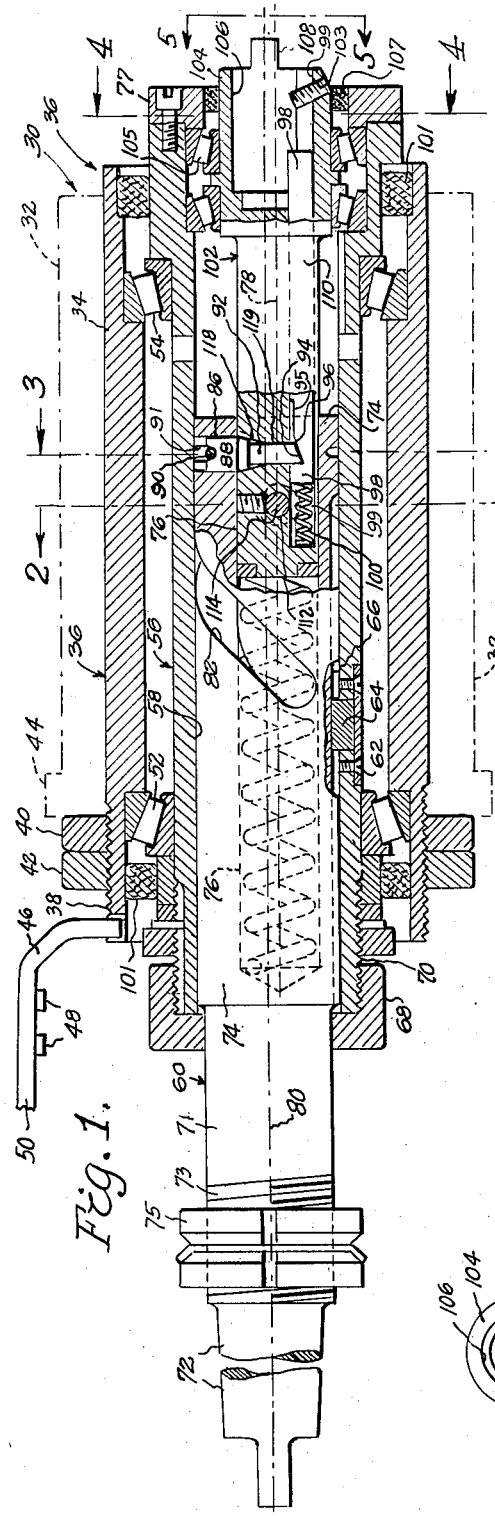
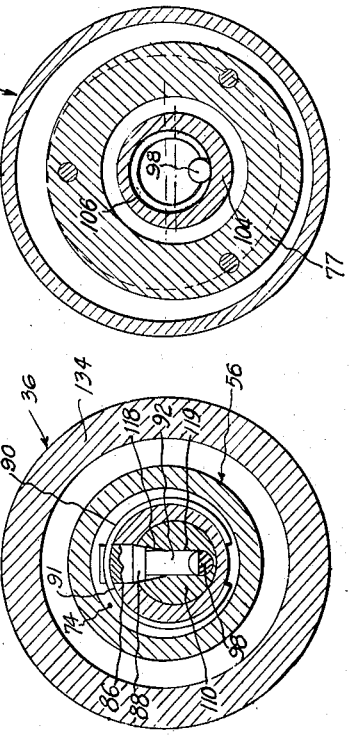
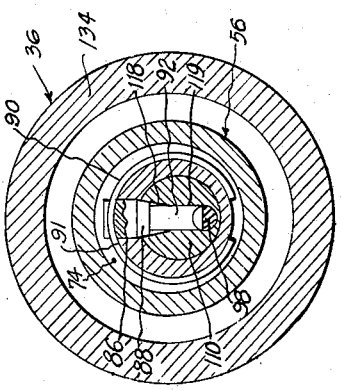
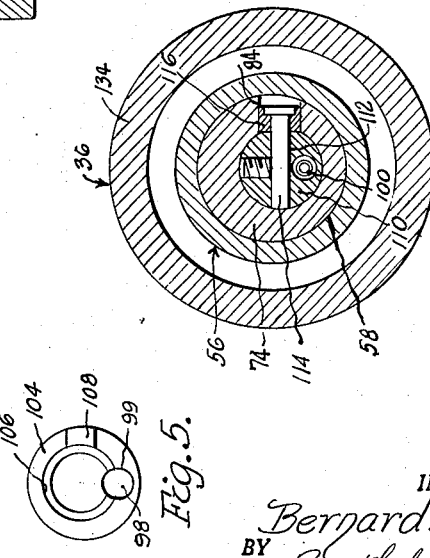
INVENTOR.
Bernard K. Stuber
BY Barthel + Bugbee
Attys

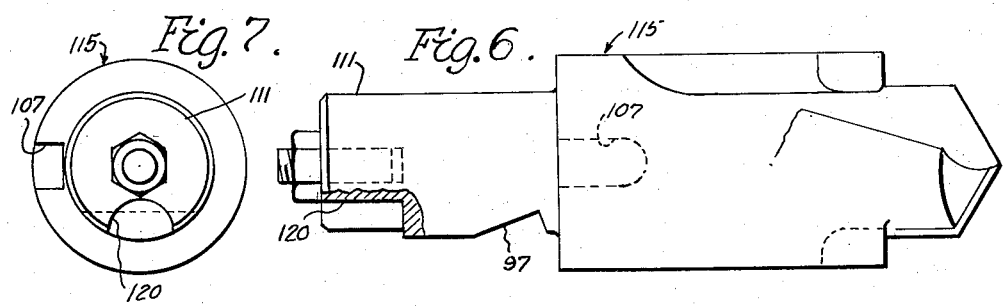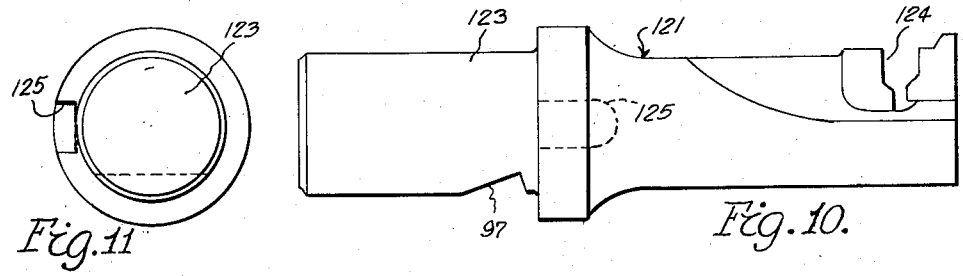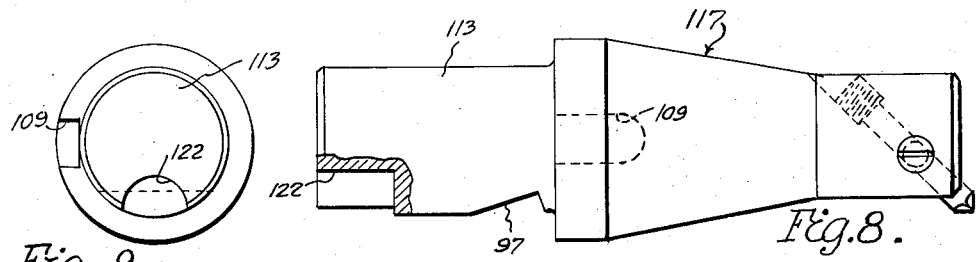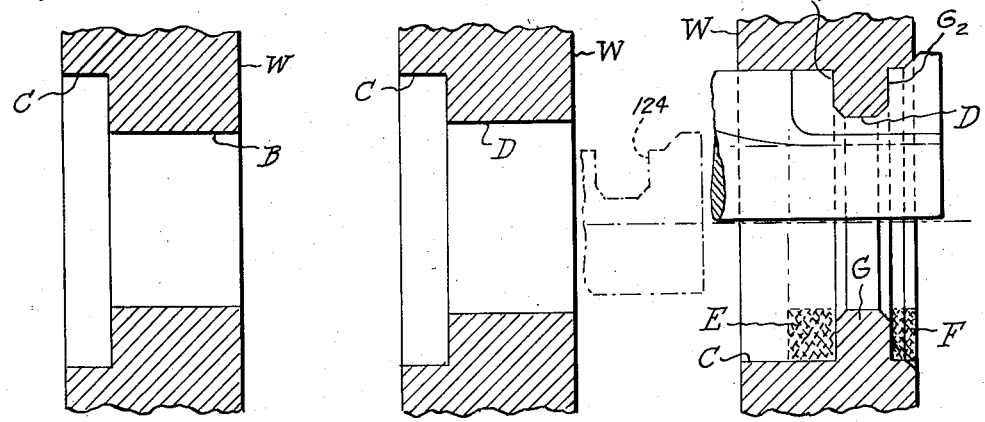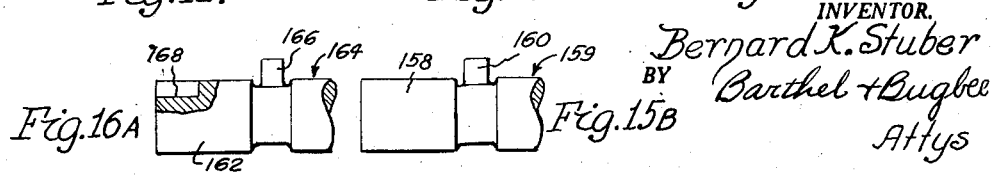

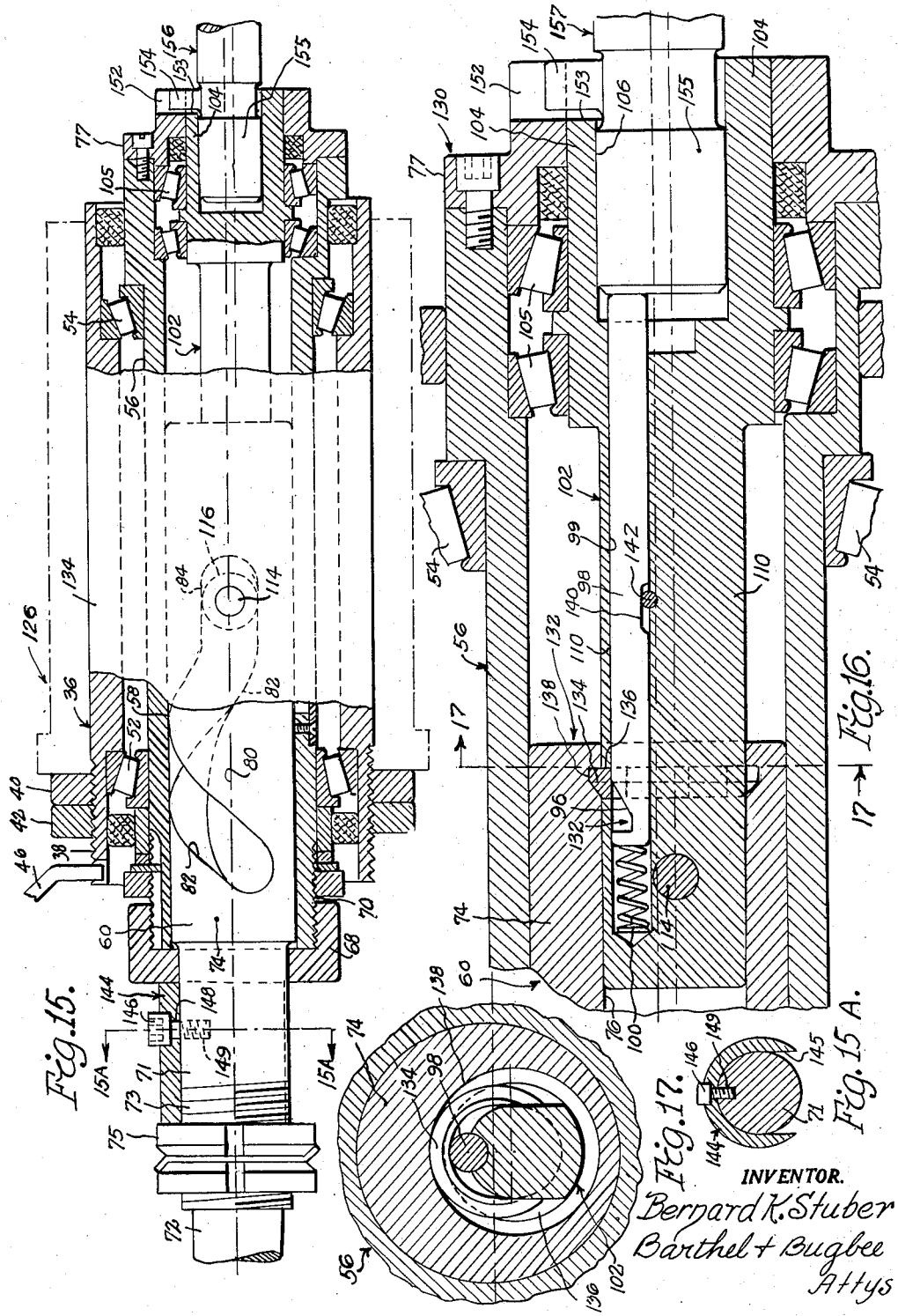

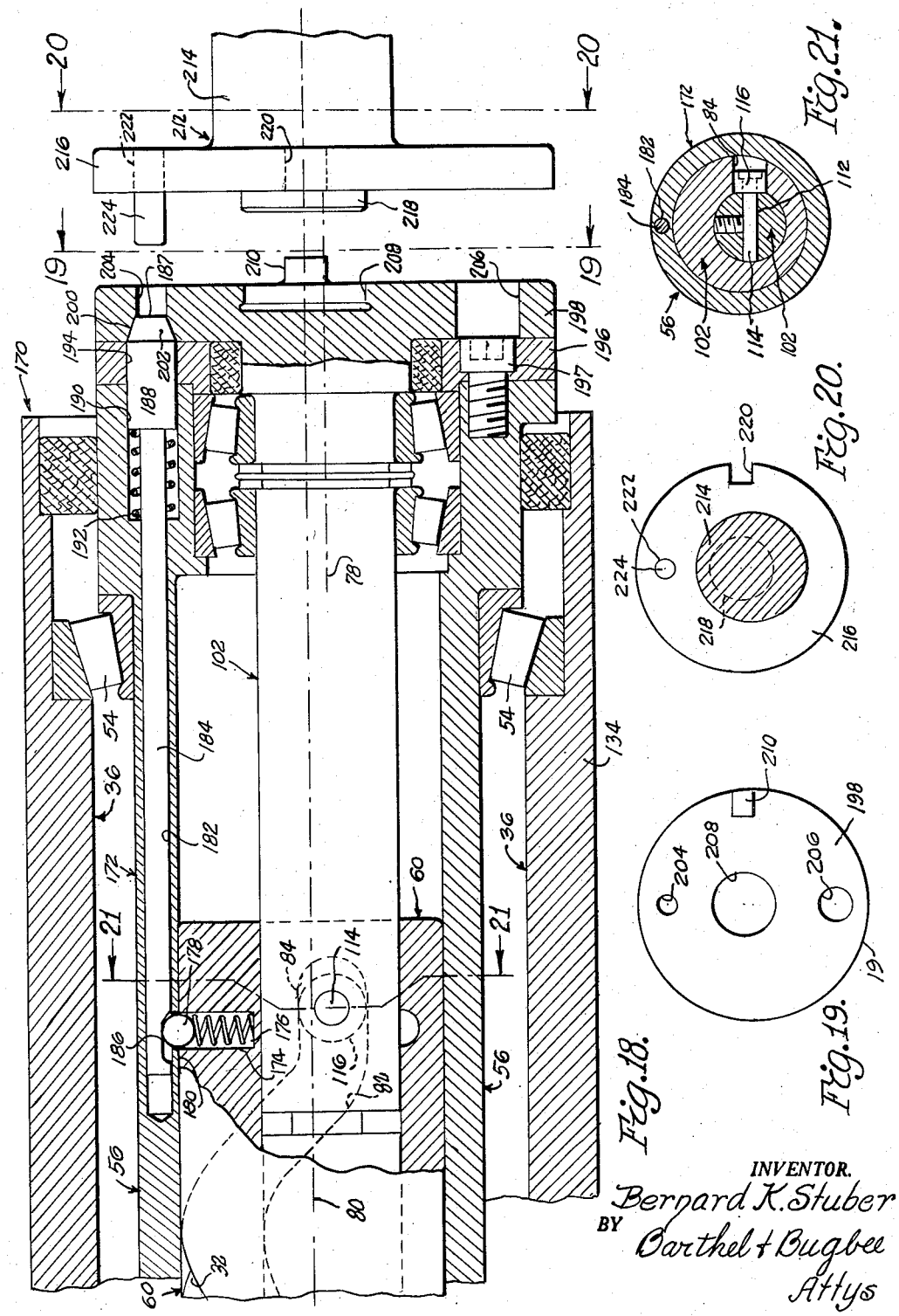

United States Patent Office 2,871,731
Patented Feb. 3, 1959

2,871,731

AUTOMATIC RECESSING DEVICE

Bernard K. Stuber, Detroit, Mich., assignor to Dawson Carbide Industries, East Detroit, Mich., a corporation of Michigan Application December 3, 1956, Serial No. 625,892

12 Claims. (Cl. 77—58)

This invention relates to metal cutting devices and, in particular, to recessing devices.

One object of this invention is to provide an automatic drilling, boring and recessing device which will successively handle drilling, boring and recessing tools in such a manner that, without attention on the part of the operator, the insertion of the drilling and boring tools will automatically cause the tools to rotate coaxially with respect to the remainder of the device when placed in a suitable boring machine and rotated by power, but which will be automatically adapted to shift the recessing tool cutting faces transversely off-center when the recessing tool is mounted in the device, so as to perform an undercut upon the previously drilled and bored workpiece.

Another object is to provide an automatic drilling, boring and recessing device of the foregoing character wherein retraction of the device automatically moves the recessing tool transversely to its coaxial position to enable it to be removed from the workpiece without interfering therewith.

Another object is to provide an automatic drilling, boring and recessing device of the foregoing character wherein the decentering mechanism for shifting the recessing tool laterally is automatically locked in coaxial position by latching mechanism which remains dormant and locked during the use of the drilling and boring tools, but which is instantly released and rendered operative upon the insertion of the recessing tool in the device.

Another object is to provide an automatic drilling, boring and recessing device of the foregoing character which is provided with a socket for receiving the various tools and wherein the latching mechanism has a release member projecting into the socket, the drilling and boring tools having cavities which receive this releasing member without actuating it but wherein the recessing tool is solid, lacking such a cavity, with the result that it engages and shifts the releasing member to release the latching mechanism and condition the device for lateral shifting of the recessing tool after insertion into the workpiece through the previously drilled and bored hole.

Another object is to provide an automatic drilling, boring and recessing device of the foregoing character as set forth in the object immediately preceding wherein rotation of the device by the machine in which it is mounted automatically causes relative rotation between a centrically-mounted hollow shaft and an eccentrically-mounted inner shaft carrying the recessing tool, with the result that the tool socket of the inner shaft and the tool mounted therein move laterally out of its concentric position into a decentered position relatively to the outer shaft in order to perform the recessing operation.

Another object is to provide an automatic drilling, boring and recessing device wherein retraction of the outer shaft automatically moves the inner shaft transversely from its decentered position into its centered or coaxial position so as to enable withdrawal of the recessing tool from the workpiece.

Other objects and advantages of the invention will become apparent during the course of the following description of the accompanying drawings, wherein:

Figure 1 is a central longitudinal section through a recessing device according to one form of the invention, certain parts thereof being shown partly in side elevation, with the drilling or boring tool removed;

Figure 2 is a cross-section taken along the line 2—2 in Figure 1;

Figure 3 is a cross-section taken along the line 3—3 in Figure 1;

Figure 4 is a cross-section taken along the line 4—4 in Figure 1;

Figure 5 is an end elevation looking in the direction of the line 5—5 in Figure 1;

Figure 6 is a side elevation, partly in longitudinal section, of a drilling tool used in the recessing device of Figure 1;

Figure 7 is a left-hand end elevation of the drilling tool shown in Figure 6;

Figure 8 is a side elevation, partly in longitudinal section, of a boring tool used in the recessing device of Figure 1;

Figure 9 is a left-hand end elevation of the boring tool shown in Figure 8;

Figure 10 is a side elevation of a recessing tool used in the recessing device of Figure 1;

Figure 11 is a left-hand end elevation of the recessing tool shown in Figure 10;

Figure 12 is an enlarged fragmentary longitudinal section through a workpiece after drilling by the drilling tool of Figures 6 and 7;

Figure 13 is an enlarged fragmentary longitudinal section through the workpiece of Figure 12 after boring by the boring tool of Figures 8 and 9;

Figure 14 is an enlarged fragmentary longitudinal section through the workpiece of Figure 13, immediately after recessing by the recessing tool of Figures 10 and 11, before retracting the recessing tool from its decentered solid line position to its centered dotted line position;

Figure 15 is a central longitudinal section through a modified recessing device showing a slotted stop sleeve inserted at the rearward end of the recessing device for locking the parts against relative axial movement, and with the rearward end portion of a drilling tool mounted therein;

Figure 15A is a cross-section, upon a slightly reduced scale, taken along the line 15A—15A in Figure 15;

Figure 15B is a side elevation, upon a reduced scale, of the rearward portion of a recessing tool used in the device of Figure 15;

Figure 16 is an enlarged fragmentary view of the forward end of a further modified recessing device, showing the rearward end portion of a boring tool mounted therein;

Figure 16A is a side elevation, partly in section, upon a reduced scale, of the rearward portion of a recessing tool used in the device of Figure 16;

Figure 17 is a cross-section taken along the line 17—17 in Figure 16;

Figure 18 is an enlarged fragmentary longitudinal section, partly in side elevation, through the forward portion of a still further modified recessing device, showing the rearward end portion of a tool removed therefrom;

Figure 19 is an end elevation looking in the direction of the line 19—19 in Figure 18;

Figure 20 is a cross-section taken along the line 20—20 in Figure 18; and

Figure 21 is a cross-section taken along the line 21—21 in Figure 18.

Automatic recessing device.—First form

Referring to the drawings in detail, Figures 1 to 5 inclusive show an automatic recessing device, generally designated 30, employed for successive drilling, boring and cross-facing or recessing operations upon workpieces W (Figures 12 to 14 inclusive), the workpiece being shown as a wall of an engine housing for purposes of illustration. The automatic recessing device 30 is so named because it enables the successive drilling, boring and recessing or cross-facing operations to be carried out automatically without danger resulting from mistake or forgetfulness on the part of the operator. In the first step, using a drilling tool (Figures 6 and 7), the automatic recessing device 30 first simultaneously drills and counterbores the workpiece W (Figure 12) to provide a bore B and counterbore C therein, the drilling tool remaining coaxial with the drive shaft. In the second step, using a boring tool (Figures 8 and 9), the device 30 next precisely rebores or finish-bores the previous bore B to a slightly increased diameter bore D (Figure 13), the boring tool also remaining coaxial with the drive shaft. In the third step, using a recessing tool (Figures 10 and 11), the device 30 automatically inserts the recessing tool into the finished bore D and then automatically moves it transversely to the axis of rotation of the drive shaft, cutting away the shaded portions E and F of the workpiece W (Figure 14) and bevels the annular rib G which remains, after which retraction of the drive shaft automatically moves the recessing tool transversely back to the centered or coaxial position, as shown by the dotted lines in Figure 14, whereupon it is automatically withdrawn from what is left of the bore D and counterbore C.

The automatic recessing device 30 consists of an outer sleeve 32 which has a bore 34 in which an intermediate sleeve 36 is slidably mounted, the left-hand end being threaded at 38 to receive a stop nut 40 and lock nut 42 which engage the flanged end 44 of the outer sleeve 38 to regulate the depth to which the sleeve 36 will move relatively to the sleeve 32 and consequently the depth to which the tools will enter the workpiece W. The sleeve 32 is supported in a fixture or bracket (not shown) secured to a stationary part of the machine, and the sleeve 36 carries an angle bracket 46, one arm 50 of which is bolted as at 48 to a slide (not shown) above it by which the intermediate sleeve 36 is moved to and fro and also prevented from rotating.

Rotatably mounted within the intermediate sleeve 36 as by the opposed tapered roller bearing assemblies 52 and 54 is an inner sleeve 56 having a bore 58 in which the main shaft 60 is reciprocably mounted and prevented from relative rotation by a key 64 engaging a keyway 66, the key 64 being held in position by a retaining plate and screws 62. A stop collar 68 is threaded onto the threaded portion 70 of the inner sleeve 56. The main shaft 60 is provided with a tapered shank 72 for reception in the usual socket of the live spindle of the driving machine or shaft. The shaft 60 also has a reduced diameter portion 71 threaded at 73 to receive threaded stop rings or nuts 75. A retaining ring 77 is bolted to the forward end of the sleeve 56.

The main shaft 60 is provided with an enlarged diameter end portion 74 having an eccentric bore 76, the axis 78 of which is displaced transversely from the main axis of rotation 80 of the main shaft 60. The main shaft enlarged portion 74 adjacent the bore 76 is provided with a helical slot 82 which at its forward end terminates in an axial notch 84 (Figures 1, 2 and 15). The wall of the enlarged shaft portion 74 is provided with a radial bore 86 in which is reciprocably mounted a slotted so-called "shot" pin 88 which is urged inwardly by an interrupted annular spring 90 mounted in an approximately annular groove 91, so that the inner end of the pin 88 is normally urged into the eccentric bore 76. The inner end of the shot pin 88 is engaged by the outer end of a lock release pin or push pin 92, the inner end of which is inclined or beveled at 94 to engage a flat surface 95 and a correspondingly-inclined cam notch 96 in an axially reciprocable push rod 98 mounted in a longitudinal bore 99 and urged to the right by a compression spring 100.

Mounted in the eccentric bore 76 is a shaft 102, the head 104 of which contains an oblique set screw 103 and is rotatably mounted by double-row anti-friction bearings 105 in the inner sleeve 56. Conventional annular seals 101 and 107 are installed outwardly of the bearings 52, 54 and 105. The head 104 has a socket 106 centered on the axis of rotation 80 of the shaft 60 for the reception of the shanks or bases 111, 113 and 123 of drilling, boring and recessing tools 115, 117 and 121 respectively. The head 104 also carries a driving lug 108 for driving these tools. The shank 110 of the eccentric shaft 102 is bored radially as at 112 (Figure 2) and set-screwed to receive and retain the axle 114 of a cam follower roller 116 rotatably mounted thereon. The roller 116 is disengaged from the axial notch 84 and engaged with the helical cam groove 82 in response to the longitudinal shifting of the shaft 60 after the eccentric shaft 102 has been unlocked from the enlarged diameter portion 74 of the main shaft 60 by the longitudinal shifting of the rods 98 and 92 and the shot pin 88 in its bore 86, as explained below in connection with the operation of the invention. The tapered nose of the shot pin 88 enters a correspondingly-tapered counterbore 118 in line with the bore 119 which contains the transverse reciprocating pin 92.

In the operation of the invention, the shanks or bases 111, and 113 of the tools 115 and 117 are successively mounted in the socket 106 with their notches 97 engaged by the set screw 103 and driven in rotation by the lug 108 in their notches 107 and 109 to first drill and counterbore the housing W at B and C and then to rebore or finish bore the bore B to the bore D. Each of these tools 115 and 117 respectively has an eccentric socket 120 and 122 (Figures 7 and 9). These sockets 120 and 122 receive the cam rod 98 without reciprocation and consequently leave the shot pin 88 and push pin 92 in their inner positions into which they are urged by the garter spring 90, as seen in Figure 1. As a consequence, the eccentric shaft 102 and main shaft 60 rotate as a unit, rotating the tools 115 and 117 successively in coaxial relationship.

When, however, the recessing tool 121 is placed in the socket 106 and its notch 125 is drivingly engaged by the lug 108, it has no socket in its shank 123 corresponding to the sockets 120 and 122 of the tools 115 and 117. Hence the end of its shank 123 in the act of insertion pushes the cam rod 98 to the left, causing the inclined notch 96 to engage the inclined end 94 of the push pin 92 and move it radially or transversely, thereby shifting the shot pin 88 out of locking relationship with the counterbore 118 and placing its inner end in line with the junction between the bore 76 and the outer surface of the eccentric shaft 102. This action unlocks the eccentric shaft 102 from the main shaft 60 which, when subsequently shifted to the right (Figures 1, 2 and 15) disengages the axial notch 84 from the cam roller 116 and engages the helical slot 82 with the cam roller 116, thereby rotating the eccentric shaft 102 in its eccentric bore 76 and consequently causing the cutting edge 124 of the tool 121 to move transversely after it has passed through the counterbore C and bore D. The cutting edge 124 of the tool 121 then performs the recessing operation to produce the internal annular rib G while simultaneously facing its opposite ends $G^1$ and $G^2$. This action is limited by the adjustable stop nut 75 engaging the stop collar 68.

Retraction of the main shaft 60 causes the helical slot 82 to rotate the eccentric shaft 102 (Figure 1) back to its initial axial position, whereby it may be retracted through what is left of the bore D after removal of the portions E and F through the counterbore C. Thus, the operator using the drilling and counterboring tool 115 and the boring tool 117 with their socketed shanks, cannot get into trouble because the eccentric shaft 102 is thereby locked automatically to the main shaft 60 but is unlocked automatically by the insertion of the recessing tool 121 with its solid shank 123.

*Automatic recessing device.—Second form*

The modified automatic recessing device, generally designated 126, shown in Figure 15 is of somewhat similar construction to the automatic recessing device 30 of Figures 1 to 5, inclusive, similar parts being designated with the same reference numerals. The recessing device 126 of Figure 15, however, is manually locked in its centered position by means of a slotted stop sleeve 144 (Figure 15A) having a diametral width slot 145 enabling it to be slipped manually on and off the reduced diameter portion 71 of the main shaft 60 and locked in position by a set screw 146 inserted through a hole 148 in the sleeve 144 and threaded into a hole 149 in the reduced diameter shaft portion 71.

In Figure 15, the retaining ring 77 is bolted to the forward end of the inner sleeve 56 as in Figure 1, but it and the head 104 are additionally provided with alignable outer and inner radial notches 152 and 153. These are adapted to be simultaneously engaged by a long radial driving lug 154 on the identical solid shanks 158 of the drilling and boring tools 156 and 157 (Figures 15 and 16), thus drivingly connecting the eccentric shaft 102 to the inner sleeve 56. The shank 158 of the recessing tool 159, however, has a short radial driving lug 160 (Figure 15B) which engages only the inner radial notch 153 in the head 104 and falls short of the outer radial notch 152 in the retaining ring 77, thereby enabling the shaft 102 and the inner sleeve 56 to be rotated independently relatively to one another for decentering the recessing tool in a manner analogous to that shown in Figure 14 and described above in connection therewith. The drilling, boring and recessing tools 156, 157 and 159 have forward cutting portions (not shown) similar to those of the drilling, boring and recessing tools 115, 117 and 121 respectively shown in Figures 6 to 11 inclusive and operate in a similar manner, hence require no additional description or illustration.

In the operation of the automatic recessing device 126 of Figure 15, to drill and bore the holes B and D in the workpiece W (Figures 12 and 13), the operator rotates the head 104 of the shaft 102 and the retaining ring 77 of the inner sleeve 56 relatively to one another until their radial notches 152 and 153 are in alignment with one another, whereupon the socket 106 becomes coaxial with the axis 80 of the main shaft 60. He then inserts the stop sleeve 105 upon the reduced diameter portion 71 of the main shaft 60 between the stop nuts 75 and the stop collar 68, and inserts the set screw 146 in the hole 149, thereby locking the above parts with the socket 106 coaxial with the main shaft 60. He then successively inserts the shanks 155 of the drilling and boring tools 156 and 157 in the socket 106 of the head 104 and drills and bores the holes B, D and C in the workpiece W in a manner analogous to that described above in connection with Figures 6 to 9, 12 and 13.

To recess the workpiece W, the operator now removes the screw 146 from the holes 148 and 149 and removes the stop sleeve 144 from the shaft portion 71, freeing the inner shaft 102 for rotation independently relative to the inner sleeve 56. He then inserts the shank 158 of the recessing tool 159 with its short driving lug 160 in the inner radial notch 153 of the head 104. The forward cutting portion of the recessing tool 159 is then inserted through the hole C into the hole D of the workpiece W (Figure 14), and the main shaft 60 started in rotation, whereupon the engagement of the roller 116 on the pin 114 with the spiral slot 82 rotates the shaft 102 and its eccentric socket 106 relatively to the main shaft 60 and out of coaxiality therewith. This action shifts the cutting edges of the recessing tool 159 laterally to perform the recessing operation in a manner similar to that described above in connection with Figures 10, 11 and 14. When the operator now retracts the recessing device 126, the initial reverse rotation of the main shaft 60 relatively to the inner shaft 102 by the interaction of the roller 116 with the spiral slot 82 shifts the cutting edges of the recessing tool 159 transversely back to its centered position so that it may be withdrawn from the workpiece in the dotted line position shown in Figure 14.

*Automatic recessing device.—Third form*

The modified automatic recessing device, generally designated 130, shown in Figures 16 and 17 is of generally similar construction to the automatic recessing device 30 shown in Figures 1 to 5 inclusive, similar parts being designated with the same reference numerals, but different automatic means, generally designated 132, is employed for locking the device in its centered position. In this locking device 132, the eccentric shaft 102 is provided as in Figure 1 with a longitudinally-reciprocable push rod 98 urged to the right by a compression spring 100, but the cam notch 96 engages an interrupted resilient tapered locking ring 134 which is adapted to be moved to and from an external arcuate tapered recess 136 (Figure 17) in the shank 110 of the eccentric shaft 102 into and out of an annular internal tapered recess 138 in the bore 76 of the main shaft 60 by the cam actions of the cam notch 96 and tapered recess 136.

In order to prevent rotation of the push rod 98 as well as to limit its reciprocation, the push rod 98 is provided with an elongated flat-bottomed longitudinal recess 140 which is engaged by a transverse pin 142 passing through the shank 110 of the eccentric shaft 102, which is drilled transversely for its reception.

As in Figure 15, the retaining ring 77 and the head 104 of the shaft 102 are provided with outer and inner radial notches 152 and 153 adapted to be engaged by the long lugs 154 on the solid shanks 158 of the same drilling and boring tools 156 and 157 described above in connection with Figures 15 and 15B. (The drilling tool 156 is shown in Figure 15 and the boring tool 157 in Figure 16.) Because the shanks 158 of the drilling and boring tools 156 and 157 are solid, their insertion in the socket 106 causes their rearward ends to push the rod 98 to the left, consequently pushing the locking ring 134 outward into the locking recess 138 and locking the eccentric shaft 102 to the main shaft 60. The shank 162 of the recessing tool 164 (Figure 16A), like the recessing tool 159 of Figure 15B, is provided with a short driving lug 166 which engages only the inner radial notch 153 and is too short to reach the outer radial notch 152.

The shank 162 of the recessing tool 164, however, is not solid but at its rearward end is provided with an eccentric recess 168 adapted to align with and receive the forward end of the push rod 98 so as not to reciprocate the latter when the shank 162 is inserted in the socket 104. The forward or cutting ends of the drilling and boring tools 156 and 157 are the same as those shown in Figures 6 and 8, whereas the forward or cutting end of the recessing tool 164 is also the same as that shown in Figure 10.

The operation of the automatic recessing device 130 shown in Figures 16 and 17 is similar to that already described above in connection with Figures 1 to 5 inclusive, except in the reversal of the locking and unlocking of the eccentric shaft 102 relatively to the main shaft 60 as mentioned immediately above. Consequently the same instructions apply. When the drilling tool 156 or the boring tool 157 is inserted in the socket 106 (Figure 16), the rearward end of its solid shank 155 shifts the push rod 98 to the left, whereupon the inclined cam notch 96 forces the arcuate locking member 134 outward into the internal arcuate recess 138 in the bore 76 of the main shaft 60, locking the shafts 102 and 60 in their centered or coaxial positions and preventing eccentric motion of the shaft 102. At the same time, their long radial driving lugs 154 drivingly engage both the outer and inner radial notches 152 and 153, drivingly connecting the shaft 102 to the inner sleeve 56.

On the other hand, when the recessing tool 166 replaces the drilling and boring tools 156 and 157 in the socket 104, the eccentric recess 168 in the shank 162 thereof receives the forward end of the push rod 98 without shifting it, hence the spring 100 maintains the push rod 98 in its position shifted to the right, with the inclined cam notch 96 aligned with the recesses 136 and 138 and ring 134. Accordingly, the arcuate locking ring 134 is forced inwardly back from the internal arcuate recess 138 into the external arcuate recess 136 by the cam or wedging action of the tapered surface of the recess 138 against the tapered surface of the arcuate locking ring 134 as the enlarged end portion 74 of the drive shaft 60 is fed further to the right. This action unlocks the eccentric shaft 102 from the main shaft 60, whereupon the action of the roller 116 in the helical slot 82 (Figures 1 and 2) rotates the eccentric shaft 102 and the cutting edge 124 of the recessing tool 121 laterally to perform the recessing operation in a manner similar to that shown in Figure 14 and described in connection therewith.

*Automatic recessing device.—Fourth form*

The further modified automatic recessing device, generally designated 170, shown in Figures 18 to 21, inclusive, is also generally similar to the automatic recessing device 30 of Figures 1 to 4 inclusive, and differs mainly in the construction and operation of the locking device, generally designated 172, for locking the eccentric shaft 102 to the main shaft 60 or unlocking these shafts for transverse or lateral motion relatively to one another. The tools used with the recessing device 170 also differ in their rearward end construction in order to operate the modified locking device 172.

In the further modified automatic recessing device 170, the main shaft 60 is provided with a transverse or radial socket 174 in which a compression spring 176 is seated. The compression spring 176 engages and urges the locking ball 178 radially outward into a hole 180 in the inner sleeve 56 opening into a longitudinal or axial bore 182 in which a push rod 184 is axially reciprocable. The inner end portion of the push rod 184 is provided with an inclined elongated cam notch 186 adapted to press the ball 178 radially inward through the hole 180 as the push rod 184 is pushed to the left, but to permit the ball 178 to move outward until its diametral plane coincides with the plane of the hole 180 so as to establish a driving connection between the shaft 60 and the inner sleeve 56, as shown in Figure 18, when the push rod 184 is pushed to the right.

The outer end 187 of the push rod 184 is provided with an enlarged head 188 (Figure 18) which reciprocates in a corresponding enlargement 190 of the bore 182. The enlargement 190 contains a compression spring 192 which urges the head 190 and push rod 184 to the right. The head 188 also passes through a bore 194 in a retaining ring 196 which is bolted as at 197 to the outer end of the inner sleeve 56 (Figure 18) and which in turn is engaged by a head 198 in the outer end of the inner or eccentric shaft 102. The head 198 extends laterally outward to the periphery of the outer end of the sleeve 56 and retaining ring 196 and is there provided with a conical bore 200 aligned with the bores 190 and 194 and adapted to receive the correspondingly-tapered outer end portion 202 of the push rod head 188. A bore 204 extends outward from the conical bore 200 coaxial therewith through the eccentric shaft head 198. The eccentric shaft head 198, in addition to an access hole 206 for the screw 197, is provided centrally with a shallow socket 208 concentric with the axis 80 of the main shaft 60 rather than with the axis 78 of the eccentric shaft 102. Finally, the eccentric shaft head 198 is provided with a radially-arranged driving lug 210 (Figure 19) in line with the center of the shallow socket 208.

The cutting portions of the drilling, boring and recessing tools used with the further modified automatic recessing device 170 of Figures 18 to 21 inclusive, will be substantially the same as the cutting portions of the drilling, boring and recessing tools 115, 117 and 121 respectively of Figures 6, 8 and 10. In Figure 18, therefore, there is shown only the recessing tool, generally designated 212, the forward portion 214 of which is substantially the same as the forward portion of the recessing tool 121 of Figure 10. The base 216 of the recessing tool 212 is in the form of a disc integral with the forward portion 214 and having a central short shank 218 adapted to fit into the shallow socket 208 with which it is aligned. The periphery of the base 216 is also provided with a radially-arranged notch 220 (Figures 18 and 20) aligned with and adapted to receive the radially-arranged lug 210 on the eccentric shaft head 198. Near its periphery, the base 216 is provided with an axial hole 222 aligned with the hole 204 in the eccentric shaft head 198 and adapted to receive a pin 224 secured therein. The pin 224 projects from the rearward face of the base 216 substantially the same distance as the thickness of the eccentric shaft head 198 so as to pass through the hole 204 and push the end 187 of the head 188 on the push rod 194 rearwardly until it is flush with the forward face of the retaining ring 196, unlocking the head 198 of the eccentric shaft 102 from the retaining ring 196 bolted to the inner sleeve 56. The corresponding rearward shifting of the push rod 184 causes the cam notch 186 to push the ball 178 radially inward a sufficient distance to unlock the inner sleeve 56 from the main shaft 60, as explained below in connection with the operation of the invention.

The drilling and boring tools (not shown) used with the further modified automatic recessing device 170 of Figures 18 to 21 inclusive, are equipped with the same base as the base 216 and also have the short shank 218 and driving notch 220, but lack the pin 224. As a consequence, these tools do not shift the push rod 184 and consequently do not unlock the sleeve 56, eccentric shaft 102 and main shaft 60 from each other as does the pin-equipped recessing tool 212.

The operation of the further modified automatic recessing device 170 has been explained in part above in connection with its construction. As in the other forms of the invention, a drilling tool, minus the pin 224, is installed in the head 198 and the drilling operation carried out to drill the workpiece W as shown, for example, in Figure 12. During the drilling operation, the eccentric shaft 102, main shaft 60 and inner sleeve 56 remain firmly locked in a coaxial position because there is no shifting of the push rod 184, due to the absence of the pin 224 from the base 216 of the drilling tool. The boring tool then replaces the drilling tool, and as this also lacks the pin 224, the above-mentioned parts remain locked in a coaxial position, boring the workpiece W, as shown in Figure 13. The recessing tool 212 is then substituted for the boring tool in the same manner, but since it is equipped with the pin 224, the latter shifts the push rod 184 as mentioned above, unlocking the eccentric shaft 102, inner sleeve 56 and main shaft 60 from one another.

The reciprocation of the main shaft 60 relatively to the eccentric shaft 102 rotates the tool receiving socket 208 about the axis of rotation 78, displacing it laterally from the axis of rotation 80 of the main shaft 60 in the manner described in connection with the operation of the automatic recessing device 30 of Figure 1 and shown in Figure 21, causing the forward portion 214 of the recessing tool 212 to perform the recessing operation on the workpiece W in a manner similar to that shown in Figure 14 and described above in connection with the operation of the automatic recessing device 30. Retraction of the main shaft 60 rotates the eccentric shaft 102 back into its original position, shifting the cutting portion 214 of the recessing tool 212 back into eccentric position, permitting it to be withdrawn through the central bore of the workpiece which it has just recessed. The recessing tool 212 is then replaced by a drilling tool and the foregoing operation repeated upon a new workpiece W.

What I claim is:

1. An automatic boring and recessing device comprising a drive shaft structure, a supporting structure rotatably supporting said drive shaft structure, a driven shaft structuree having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second position with the receiver axis eccentric to said drive shaft structure, and shaft-locking mechanism releasably locking said shaft structures to one another with said receiver coaxial with said drive shaft structure, said mechanism including an actuating member adapted to engage a tool of one type positioned in said receiver but avoiding engagement with a tool of a different type positioned in said receiver.

2. An automatic boring and recessing device comprising a drive shaft structure, a supporting structure rotatably supporting said drive shaft structure, a driven shaft structure having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second position with the receiver axis eccentric to said drive shaft structure, and shaft-locking mechanism releasably locking said shaft structures to one another with said receiver coaxial with said drive shaft structure, said mechanism including an actuating member adapted to engage a tool of one type positioned in said receiver but avoiding engagement with a tool of a different type positioned in said receiver, said locking mechanism including a locking element mounted on one of said shaft structures and movable into and out of locking engagement with the other of said shaft structures in response to the motion of said actuating member.

3. An automatic boring and recessing device comprising a drive shaft structure, a supporting structure rotatably supporting said drive shaft structure, a driven shaft structure having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second position with the receiver axis eccentric to said drive shaft structure, and shaft-locking mechanism releasably locking said shaft structures to one another with said receiver coaxial with said drive shaft structure, said mechanism including an actuating member adapted to engage a tool of one type positioned in said receiver but avoiding engagement with a tool of a different type positioned in said receiver, said actuating member having a cam portion thereon and said locking mechanism including a locking element mounted on one of said shaft structures and movable into and out of locking engagement with the other of said shaft structures in response to the motion of said cam portion on said actuating member.

4. An automatic boring and recessing device comprising a drive shaft structure, a supporting structure rotatably supporting said drive shaft structure, a driven shaft structure having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second position with the receiver axis eccentric to said drive shaft structure, and shaft-locking mechanism releasably locking said shaft structures to one another with said receiver coaxial with said drive shaft structure, said mechanism including an actuating member adapted to engage a tool of one type positioned in said receiver but avoiding engagement with a tool of a different type positioned in said receiver, said locking mechanism including a locking element mounted on one of said shaft structures and movable into and out of locking engagement with the other of said shaft structures in response to the motion of said actuating member, said locking element comprising a pin movably mounted in one of said shaft structures into and out of locking engagement with a recess in the other shaft structure.

5. An automatic boring and recessing device comprising a drive shaft structure, a supporting structure rotatably supporting said drive shaft structure, a driven shaft structure having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second position with the receiver axis eccentric to said drive shaft structure, and shaft-locking mechanism releasably locking said shaft structures to one another with said receiver coaxial with said drive shaft structure, said mechanism including an actuating member adapted to engage a tool of one type positioned in said receiver but avoiding engagement with a tool of different type positioned in said receiver, said actuating member having a cam portion thereon and said locking mechanism including a locking element mounted on one of said shaft structures and movable into and out of locking engagement with the other of said shaft structures in response to the motion of said cam portion on said actuating member, said locking element comprising a pin movably mounted in one of said shaft structures into and out of locking engagement with a recess in the other shaft structure.

6. An automatic boring and recessing device comprising a drive shaft structure, a supporting structure rotatably supporting said drive shaft structure, a driven shaft structure having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second position with the receiver axis eccentric to said drive shaft structure, and shaft-locking mechanism releasably locking said shaft structures to one another with said receiver coaxial with said drive shaft structure, said mechanism including an actuating member adapted to engage a tool of one type positioned in said receiver but avoiding engagement with a tool of a different type positioned in said receiver, said locking mechanism including a locking element mounted on one of said shaft structures and movable into and out of locking engagement with the other of said shaft structures in response to the motion of said actuating member, one of said structures having a locking recess therein, said locking element comprising an arcuate member movably mounted on the other of said shaft structures into and out of locking engagement with said locking recess.

7. An automatic boring and recessing device comprising a drive shaft structure, a supporting structure rotatably supporting said drive shaft structure, a driven shaft structure having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second position with the receiver axis eccentric to said drive shaft structure, and shaft-locking mechanism releasably locking said shaft structures to one another with said receiver coaxial with said drive shaft structure, said mechanism including an actuating member adapted to engage a tool of one type positioned in said receiver but avoiding engagement with a tool of a different type positioned in said receiver, said actuating member having a cam portion thereon and said locking mechanism including a locking element mounted on one of said shaft structures and movable into and out of locking engagement with the other of said shaft structures in response to the motion of said cam portion on said actuating member, one of said structures having a locking recess therein, said locking element comprising an arcuate member movably mounted on the other of said shaft structures into and out of locking engagement with said locking recess.

8. An automatic boring and recessing device comprising a drive shaft structure, a supporting structure rotatably supporting said drive shaft structure, a driven shaft structure having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second position with the receiver axis eccentric to said drive shaft structure, and shaft-locking mechanism releasably locking said shaft structures to one another with said receiver coaxial with said drive shaft structures, said mechanism including an actuating member adapted to engage a tool of one type positioned in said receiver but avoiding engagement with a tool of a different type positioned in said receiver, said drive shaft structure including outer and inner components, said locking mechanism including a locking element mounted on one of said components and movable into and out of locking engagement with the other of said components in response to the motion of said actuating member.

9. An automatic boring and recessing device comprising a drive shaft structure, a supporting structure rotatably supporting said drive shaft structure, a driven shaft structure having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second position with the receiver axis eccentric to said drive shaft structure, and shaft-locking mechanism releasably locking said shaft structures to one another with said receiver coaxial with said drive shaft structure, said mechanism including an actuating member adapted to engage a tool of one type positioned in said receiver but avoiding engagement with a tool of a different type positioned in said receiver, said drive shaft structure including outer and inner components, said locking mechanism including a locking element mounted on one of said components and movable into and out of locking engagement with the other of said components in response to the motion of said actuating member, said driven shaft structure having a hole therein aligned with said actuating member, and said actuating member being receivable in said hole in locked relationship with said driven shaft structure upon insertion of one of said tools in said tool receiver but shifted out of said hole into unlocked relationship with said driven shaft structure upon insertion of the other of said tools in said tool receiver.

10. An automatic boring and recessing device comprising a drive shaft structure, a supporting structure rotatably supporting said drive shaft structure, a driven shaft structure having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second position with the receiver axis eccentric to said drive shaft structure, and shaft-locking mechanism releasably locking said shaft structures to one another with said receiver coaxial with said drive shaft structures, said mechanism including an actuating member adapted to engage a tool of one type positioned in said receiver but avoiding engagement with a tool of a different type positioned in said receiver, said drive shaft structure including outer and inner components with aligned transverse bores therein, said locking mechanism including a locking element mounted in the bore of one of said components and movable into and out of locking engagement with the bore of the other of said components in response to the motion of said actuating member.

11. An automatic boring and recessing device comprising a drive shaft structure, a supporting structure rotatably supporting said drive shaft structure, a driven shaft structure having a tool receiver mounted eccentrically therein, one of said previously-mentioned structures rotatably supporting said driven shaft structure upon an axis of rotation parallel but eccentric to the aixs of rotation of said drive shaft structure, a tool driver on one of said shaft structures drivingly engageable with a tool held in said receiver, means for shifting said receiver laterally parallel to said drive shaft structure from a first position with the receiver coaxial with said drive shaft structure into a second portion with the receiver axis eccentric to said drive shaft structure, and shaft-locking mechanism releasably locking said shaft structures to one another with said receiver coaxial with said drive shaft structures, said mechanism including an actuating member adapted to engage a tool of one type positioned in said receiver but avoiding engagement with a tool of a different type positioned in said receiver, said drive shaft structure including outer and inner components with aligned transverse bores therein, said locking mechanism including a locking element mounted in the bore of one of said components and movable into and out of locking engagement with the bore of the other of said components in response to the motion of said actuating member, said driven shaft structure having a hole therein aligned with said actuating member, and said actuating member being receivable in said hole in locked relationship with said driven shaft structure upon insertion of one of said tools in said tool receiver but shifted out of said hole into unlocked relationship with said driven shaft structure upon insertion of the other of said tools in said tool receiver.

12. An automatic boring and recessing device comprising a drive shaft structure having an outer component, a supporting structure rotatably supporting said outer component, said drive shaft structure having an inner component reciprocably mounted in said outer component, a driven shaft structure having a tool receiver mounted eccentrically therein, one of said previously-mentioned structures rotatably supporting said driven shaft structure upon an axis of rotation parallel but eccentric to the axis of rotation of said drive shaft structure, a tool driver on one of said shaft structures drivingly engageable with a tool held in said receiver, means including a generally helical guide portion on said inner component and a follower element on said driven shaft structure engageable with said guide portion for shifting said receiver laterally parallel to said drive shaft structure from a first position with the receiver coaxial with said drive shaft structure into a second position with the receiver axis accentric to said drive shaft structure, and shaft-locking mechanism releasably locking said shaft structures to one another with said receiver coaxial with said drive shaft structure, said mechanism including an actuating member adapted to engage a tool of one type positioned in said receiver but avoiding engagement with a tool of a different type positioned in said receiver.

References Cited in the file of this patent

UNITED STATES PATENTS 2,585,038     Rogacki               Feb. 12, 1952